United States Patent [19]

Gelbart

[11] Patent Number: 4,567,585
[45] Date of Patent: Jan. 28, 1986

[54] OPTICAL TAPE RECORDER USING LINEAR SCANNING

[76] Inventor: Daniel Gelbart, 4616 Garden Grove Dr., Burnaby, B.C., Canada, V5G-3V3

[21] Appl. No.: 547,329

[22] Filed: Oct. 31, 1983

[51] Int. Cl.[4] .......................... G11B 7/00; G11B 27/00
[52] U.S. Cl. ...................................... 369/97; 358/285;
 358/293; 369/44; 369/52; 369/56; 369/57;
 369/115; 369/119; 369/125
[58] Field of Search ....................... 369/43, 44, 52, 97,
 369/98, 115, 119, 121, 125, 56, 57; 358/293,
 285, 345, 347, 348; 346/76 L

[56] References Cited

U.S. PATENT DOCUMENTS 2,245,286  6/1941  Marzocchi .................... 369/97 X
3,999,010 12/1976  Oosaka et al. ............... 358/285 X
4,290,086  9/1981  Spencer et al. ............... 358/285 X

*Primary Examiner*—Robert L. Richardson

[57] ABSTRACT

An optical tape recorder is disclosed using the linear motion of a slide to record data across a slowly moving tape made of light sensitive material. Data is recorded on the tape by modulating the output of a laser in accordance with the data and focussing the modulated light onto the tape using a lens mounted on a slide. The position of the slide is measured using a linear optical encoder and this information is used to place the data accurately on the tape. The slide is connected to a spring and driven electromagnetically at its resonant frequency.

4 Claims, 1 Drawing Figure

OPTICAL TAPE RECORDER USING LINEAR SCANNING

BACKGROUND OF THE INVENTION

The present invention relates to optical recording of data and in particular to the recording of data on a moving optical tape using a focussed laser beam.

One of the problems in scanning optical tape is that most prior art scanners use a rotary motion of the scanning element. This rotary motion generates a curved scan and the two methods proposed to rectify this condition are use of a field flattening lens, as shown in U.S. Pat. No. 4,168,506 and others or curving on the tape, for example, as shown in U.S. Pat. No. 3,874,621. The field flattening lens limits the maximum numerical apperture which can be used, thus limits the smallest spot size achievable and limiting the optical storage density. Curving the tape makes it difficult to control its movement to the degree of accuracy required in high density optical data storage.

The current invention generates an orthogonal scan by scanning linearly across a slow moving tape. Since the tape stays flat its motion can be precisely controlled. Since the focussing lens is used on its optical axis a large numerical apperture can be used yielding very high data storage densities. A further advantage of this invention is driving the scanner at its resonant frequency, a method requiring a very small amount of power to achieve a large movement.

SUMMARY OF THE INVENTION

The general purpose of this invention to record data on a light sensitive tape using modulated light. The data densities possible exceed other forms of data storage without any increase in complexity of the recording apparatus. In order to cover all the tape area a linear scanner is disclosed traversing the width of a slowly moving optical tape. A small lens mounted on the scanner focusses a modulated laser beam onto the surface of the optical tape. The recording mechanism is generally of the thermal or ablative type. The scanning part is forced to follow a straight line by using linear gas bearings. An alternate way is suspending the moving part from flat springs arranged in a way forcing a straight line motion. The position of the scanning part is measured using a linear optical encoder. An alternate way is using a laser interferometer.

The modulation of the light intensity in accordance with the data is best achieved by using of a laser diode, since the output of a laser diode is proportional to the current going through it and the current can be made proportional to the data signal.

DESCRIPTION OF THE DRAWINGS

The exact nature of this invention will be readily apparent from consideration of the following specifications relating to the annexed drawing, FIG. 1, which represents a perspective view of the recorder system.

DESCRIPTION OF THE PREFERRED EMBODIMENT

Figure 1:
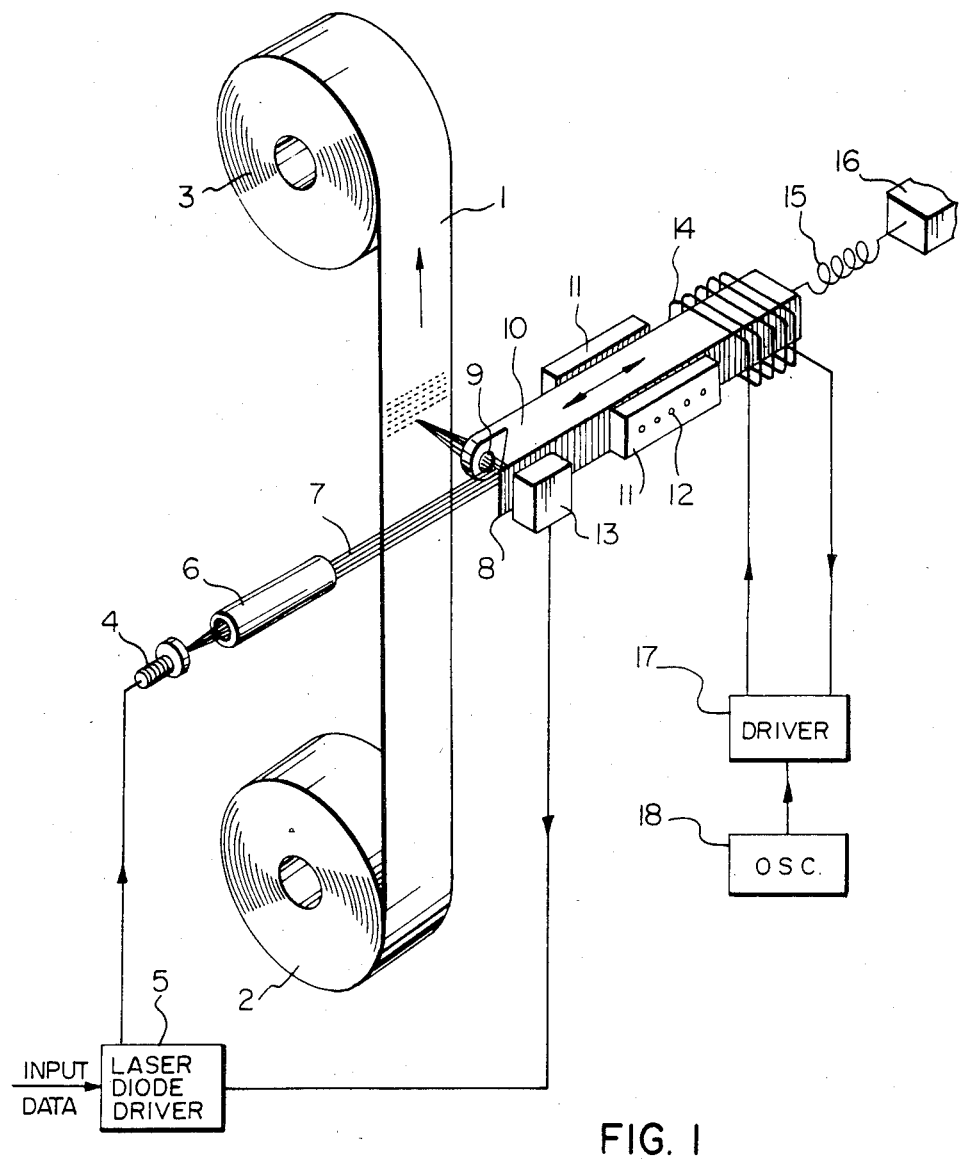

Referring now to FIG. 1, a slowly moving tape made of light sensitive material 1 is moving from supply reel 2 to take-up reel 3. The incoming data signal causes the driver 5 to modulate the current through laser diode 4, thus the light intensity in beam 7 corresponds to the incoming data. Collimator 6 generates a parallel beam from the divergent beam emitted by laser diode 4. Beam 7 is being reflected by mirror 8 forming part of the slide 10. The reflected beam is focussed by lens 9 onto the tape 1 where it creates a permanent record on the light sensitive material. The slide 10 moves on linear gas bearings 11. The gas is fed via perforations 12. The slide 10 is made of ferromagnetic material and is being attracted by the stationary coil 14 against the force of return spring 15 anchored to stationary body 16. As the slide moves in and out it traverses the width of the tape and writes one line of data. The motion of the tape provides the necessary separation between lines. A linear optical encoder 13 measures the position of the slide in order to locate the recorded data accurately on the tape. The coil 14 is driven from an oscillator 18 via an amplifier 17 at a frequency given by $$f = \frac{1}{2\pi} \sqrt{\frac{k}{m}},$$

where k=spring constant of spring 15 and m=mass of slide. When k is given in newtons per meter and m is in kilograms f will be the resonant frequency of the slide in Hertz.

What is claimed is:

1. An optical data recorder comprising:
   a laser modulated according to incoming data;
   a tape made of light sensitive material;
   a slide constrained to move in a straight line reciprocally and transversly to said tape;
   a mirror mounted on said slide onto which said modulated laser beam impinges;
   a lens mounted on said slide to focus laser light reflected from said mirror into a small spot on said tape causing a permanent mark when said laser is turned on;
   means for accurately measuring the position of said slide;
   means for placing said marks on said tape in accordance with the measured position of said slide;
   and means for moving said tape slowly in a direction transverse to motion of said slide.

2. An optical data recorder as set forth in claim 1, further including a spring coupling said slide to a stationary part of said recorder and means for driving said slide at its resonant frequency of $$\frac{1}{2\pi} \sqrt{\frac{k}{m}}$$

where k is the spring constant of said spring and m is the total mass of the slide.

3. An optical data recorder as set forth in claim 2, wherein said slide is made of a ferromagnetic material and it oscillates in response to a periodic magnetic field generated by an electric current flowing through a stationary coil.

4. An optical data recorder as set forth in claim 1, wherein the said slide is constrained to move in a straight line by linear gas bearings.

* * * * *